United States Patent
Ganesan et al.

(10) Patent No.: US 11,954,181 B2
(45) Date of Patent: Apr. 9, 2024

(54) SYSTEM AND METHOD FOR MANAGING VIRTUAL HARDWARE LICENSES OF HARDWARE RESOURCES ACCESSED VIA APPLICATION INSTANCES

(71) Applicant: Dell Products L.P., Hopkinton, MA (US)

(72) Inventors: Vaideeswaran Ganesan, Bangalore (IN); Viswanathan Balakrishnan, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 690 days.

(21) Appl. No.: 17/124,393

(22) Filed: Dec. 16, 2020

(65) Prior Publication Data

US 2022/0188385 A1  Jun. 16, 2022

(51) Int. Cl.
*G06F 21/10* (2013.01)
*H04L 9/30* (2006.01)

(52) U.S. Cl.
CPC .............. *G06F 21/105* (2013.01); *H04L 9/30* (2013.01); *G06F 21/109* (2023.08)

(58) Field of Classification Search
CPC ....... G06F 21/105; G06F 21/109; H04L 9/30; H04L 9/0643
See application file for complete search history.

(56) References Cited

U.S. PATENT DOCUMENTS

| | | | | |
|---|---|---|---|---|
| 8,763,159 B1* | 6/2014 | Kobets | ................. | G06Q 50/184 726/31 |
| 8,775,282 B1* | 7/2014 | Ward, Jr. | ............ | H04L 41/0896 709/224 |
| 9,246,942 B2* | 1/2016 | Xue | ........................ | H04L 63/20 |
| 9,275,408 B1* | 3/2016 | King | ....................... | G06F 21/33 |
| 9,553,858 B2* | 1/2017 | Anand | ............... | H04L 63/0823 |
| 11,095,501 B2* | 8/2021 | Beyh | ................... | H04L 41/0895 |
| 11,115,348 B2* | 9/2021 | Sharifi Mehr | .......... | H04L 47/80 |
| 11,245,592 B1* | 2/2022 | Thomson | ............ | G06F 9/44505 |
| 2003/0177074 A1* | 9/2003 | Ramanathan | ........... | G06F 21/10 705/59 |
| 2006/0004667 A1* | 1/2006 | Neil | ...................... | G06F 21/126 705/59 |

(Continued)

*Primary Examiner* — David Garcia Cervetti
(74) *Attorney, Agent, or Firm* — Chamberlain, Hrdlicka, White, Williams, & Aughtry; Aly Z. Dossa

(57) ABSTRACT

A method for managing hardware resources includes obtaining, by a local virtual hardware license manager, a license request from an application instance, in response to the license request: sending a virtual hardware license request to a license management system, wherein the virtual hardware license request comprises a hardware resource list, making a first determination that a response to the virtual hardware license request validates the virtual hardware license request, and in response to the first determination: providing, based on the hardware resource list, a signed hardware resource document to a hardware resource manager managing a hardware resource, wherein the hardware resource list specifies the hardware resource, updating a hardware resource access repository to specify enabled access of the hardware resource by the application instance, and initiating access to the hardware resource by the application instance.

17 Claims, 10 Drawing Sheets

(56) References Cited

U.S. PATENT DOCUMENTS

| | | | |
|---|---|---|---|
| 2009/0276856 A1* | 11/2009 | Pichetti | G06F 21/10 |
| | | | 726/26 |
| 2009/0327471 A1* | 12/2009 | Astete | G06F 9/45558 |
| | | | 718/1 |
| 2009/0328225 A1* | 12/2009 | Chambers | G06F 9/45533 |
| | | | 718/1 |
| 2010/0124235 A1* | 5/2010 | Walsh | H04L 63/10 |
| | | | 370/449 |
| 2011/0197062 A1* | 8/2011 | De Gaetano | H04L 63/10 |
| | | | 713/167 |
| 2012/0131652 A1* | 5/2012 | Anand | H04L 63/0823 |
| | | | 726/5 |
| 2015/0007175 A1* | 1/2015 | Potlapally | G06F 9/45558 |
| | | | 718/1 |
| 2015/0074770 A1* | 3/2015 | McBeath | G06F 21/44 |
| | | | 726/4 |
| 2015/0170302 A1* | 6/2015 | Brant | G06F 21/121 |
| | | | 705/59 |
| 2018/0027053 A1* | 1/2018 | Ringdahl | G06F 9/5077 |
| | | | 709/226 |
| 2018/0268115 A1* | 9/2018 | Zhang | G06F 9/455 |
| 2021/0026935 A1* | 1/2021 | Geist | H04L 9/0637 |
| 2021/0084018 A1* | 3/2021 | Stuntebeck | G06F 21/335 |

\* cited by examiner

SYSTEM AND METHOD FOR MANAGING VIRTUAL HARDWARE LICENSES OF HARDWARE RESOURCES ACCESSED VIA APPLICATION INSTANCES

BACKGROUND

Computing devices in a system may include any number of hardware resources such as processors, memory, and persistent storage. The utilization of these hardware resources by clients via application instances may be managed by license management systems. As new application instances are initiated on nodes, additional licenses may need to be created or renewed in order for the new application instances to use the requested hardware resources.

SUMMARY

In general, in one aspect, the invention relates to a method for managing hardware resources. The method includes obtaining, by a local virtual hardware license manager, a license request from an application instance, in response to the license request: sending a virtual hardware license request to a license management system, wherein the virtual hardware license request comprises a hardware resource list, making a first determination that a response to the virtual hardware license request validates the virtual hardware license request, and in response to the first determination: providing, based on the hardware resource list, a signed hardware resource document to a hardware resource manager managing a hardware resource, wherein the hardware resource list specifies the hardware resource, updating a hardware resource access repository to specify enabled access of the hardware resource by the application instance, and initiating access to the hardware resource by the application instance.

In one aspect, the invention relates to a non-transitory computer readable medium in accordance with one or more embodiments of the invention, which includes computer readable program code, which when executed by a computer processor enables the computer processor to perform a method for managing hardware resources. The method includes obtaining, by a local virtual hardware license manager, a license request from an application instance, in response to the license request: sending a virtual hardware license request to a license management system, wherein the virtual hardware license request comprises a hardware resource list, making a first determination that a response to the virtual hardware license request validates the virtual hardware license request, and in response to the first determination: providing, based on the hardware resource list, a signed hardware resource document to a hardware resource manager managing a hardware resource, wherein the hardware resource list specifies the hardware resource, updating a hardware resource access repository to specify enabled access of the hardware resource by the application instance, and initiating access to the hardware resource by the application instance.

In one aspect, the invention relates to a system in accordance with one or more embodiments of the invention, which includes a processor and memory that includes instructions, which when executed by the processor, perform a method. The method includes obtaining, by a local virtual hardware license manager, a license request from an application instance, in response to the license request: sending a virtual hardware license request to a license management system, wherein the virtual hardware license request comprises a hardware resource list, making a first determination that a response to the virtual hardware license request validates the virtual hardware license request, and in response to the first determination: providing, based on the hardware resource list, a signed hardware resource document to a hardware resource manager managing a hardware resource, wherein the hardware resource list specifies the hardware resource, updating a hardware resource access repository to specify enabled access of the hardware resource by the application instance, and initiating access to the hardware resource by the application instance.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing virtual hardware licenses. The virtual hardware licenses may specify an application instance(s) and a set of one or more hardware resources that may be accessed by the application instance(s). Embodiments of the invention may utilize a license management system that manages the virtual hardware licenses. Embodiments of the invention may further utilize local hardware resource repositories that track which application instances are allowed to use the application instances and whether a hardware resource is already being used for a virtual hardware license. When an application instance requests to utilize a virtual hardware license, a working list of hardware resources provided to the application instance by the virtual hardware license is sent to the license management system to verify that the virtual hardware license has not already been utilized to access any hardware resources. The license management system may respond either validating the working list or denying the working list. If the working list is validated, then access may be further validated by hardware resource local systems managing the hardware resources.

Embodiments of the invention further include methods for relinquishing access to the hardware resources by an application instance. The access is relinquished by updating the hardware resource license repository of the hardware resources and preparing an application instance with access to the hardware resources.

Figure 1A:
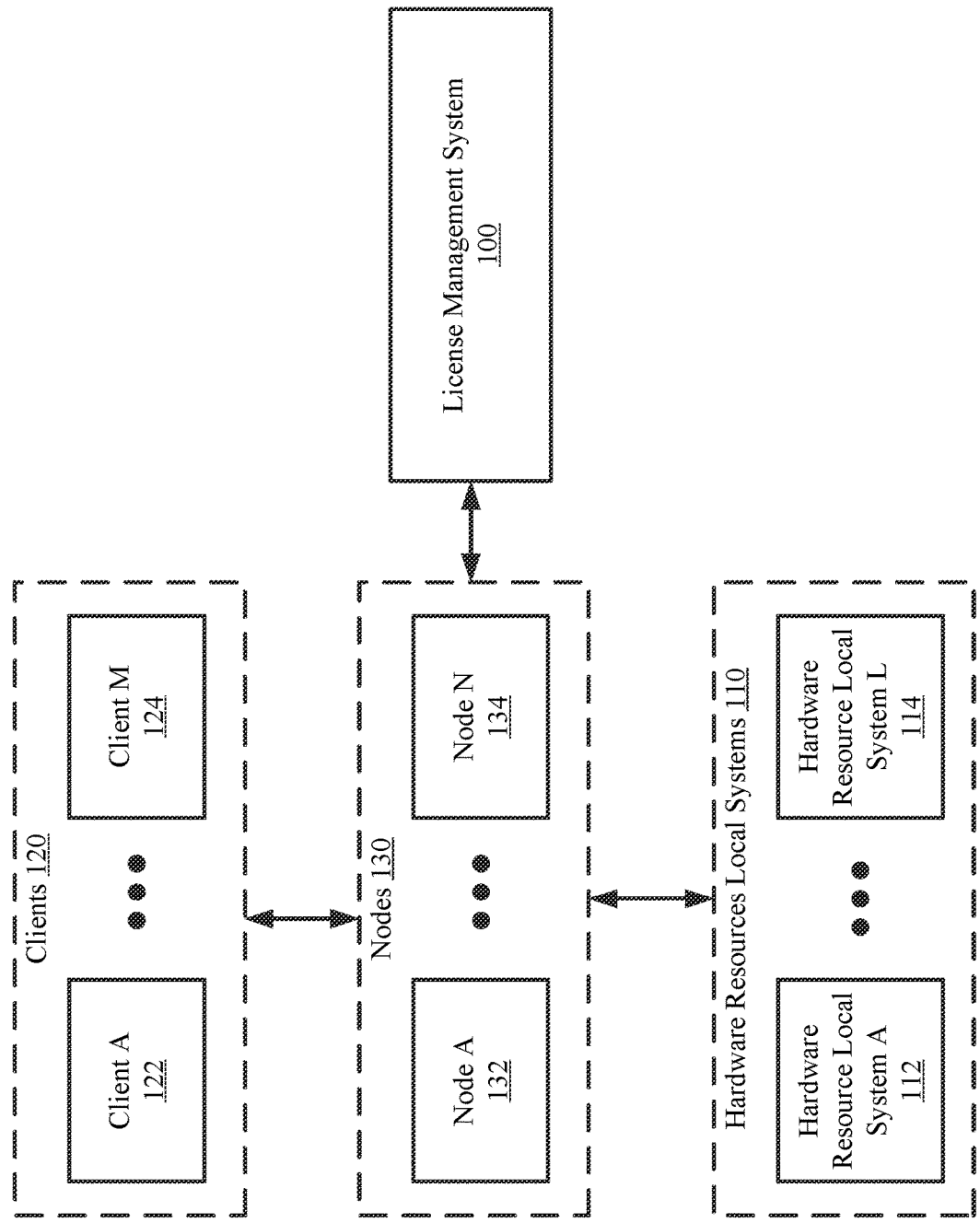
FIG. 1A shows a diagram of a system in accordance with one or more embodiments of the invention.

FIG. 1A shows a diagram of a system in accordance with one or more embodiments of the invention. The system includes a license management system (100), hardware resources local systems (110), clients (120), and nodes (130). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the license management system (100) manages virtual hardware licenses. The virtual hardware licenses specify users that are allowed to utilize a set of one or more hardware resources via an application instance executing on a node. The virtual hardware resources provides signed hardware resource documents that may be verified by the hardware resource local systems (110) that specify whether the hardware resource local systems (110) are to provide access to the application instance.

In one or more embodiments of the invention, a virtual hardware license may vary from a hardware license. A hardware license may refer to a license that is directly associated to a hardware resource. Said another way, the hardware license may enable access to a specific hardware resource by an application instance. In order for the application instance to attempt to access a second hardware resource, purchase of a new hardware license is required.

In one or more embodiments of the invention, the virtual hardware licenses may further vary from a software license. In one or more embodiments of the invention, the software license refers to a license directly associated with a software program (e.g., an application). Further, the software licenses may enable use of any hardware resources by an application instance in a node (discussed below). In order for a user to access a second application instance, purchase of a new software license is required, which may utilize the same or different hardware resources.

In contrast to both hardware licenses and software licenses, a virtual hardware license is similar to a software license that limits use of hardware resources similar to a hardware license. Said another way, a virtual hardware license associates an application instance to a hardware resource. However, if a new application instance operated by the user desires to take over for use of the hardware resource, an application instance takeover (discussed in FIGS. 2C-2D) may be initiated.

Figure 4:
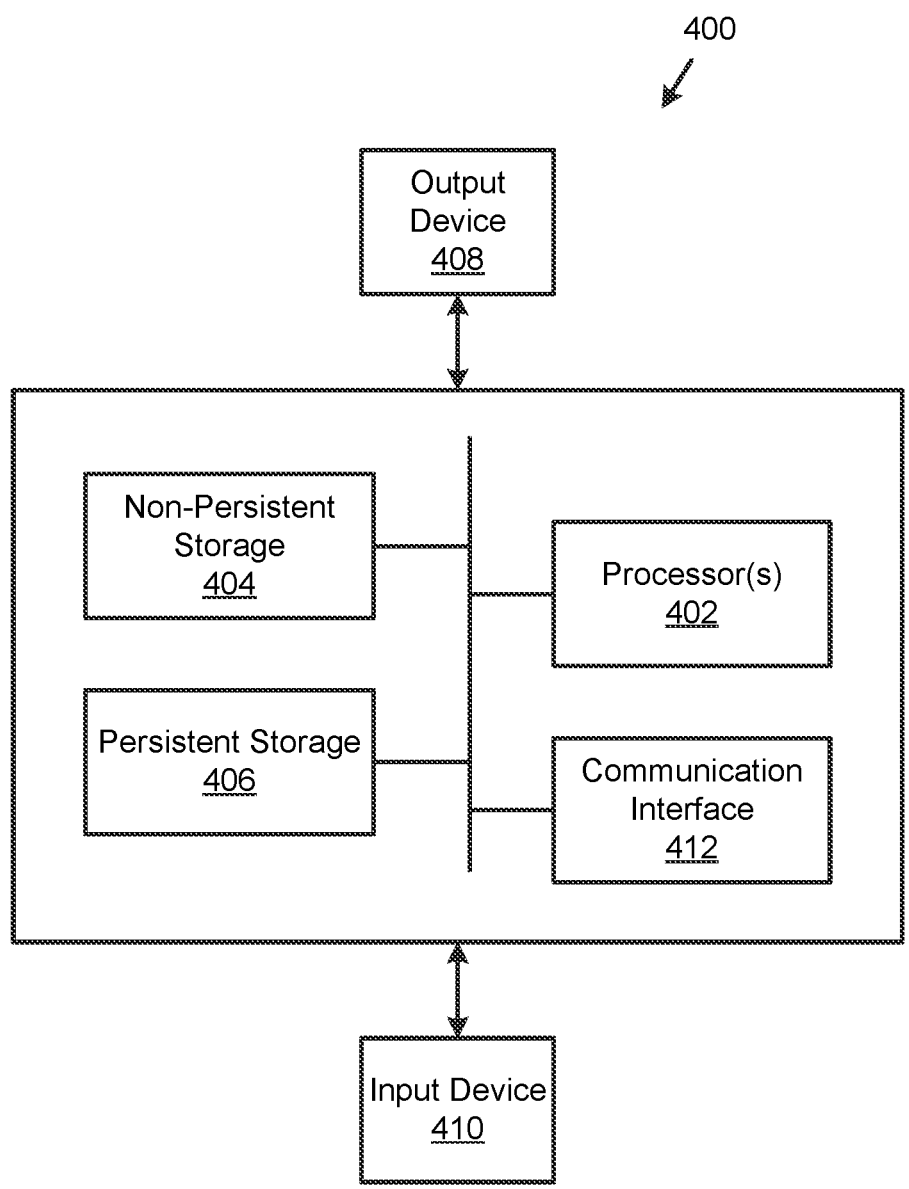
FIG. 4 shows a diagram of a computing device in accordance with one or more embodiments of the invention.

In one or more embodiments of the invention, the license management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the license management system (100) described in this application.

The license management system (100) may be implemented as a logical device without departing from the invention. The logical device utilizes computing resources of any number of physical computing devices to provide the functionality of the license management system (100) described throughout this application and/or all, or portion, of the methods illustrated in FIG. 2A. For additional details regarding the license management system, see, e.g., FIG. 1B.

Figure 1B:
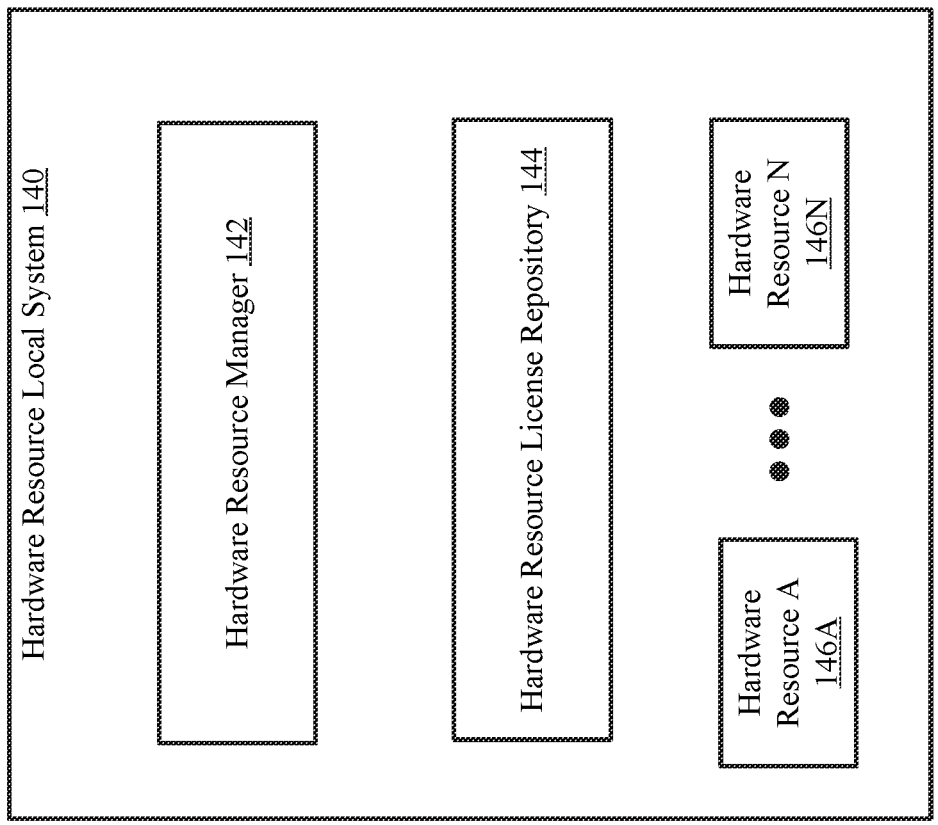
FIG. 1B shows a diagram of a license management system in accordance with one or more embodiments of the invention.

In one or more embodiments of the invention, the hardware resources local systems (110) are systems that include hardware resources (further discussed in FIG. 1B). The hardware resources in the hardware resource local systems (e.g., 112, 114) may be accessed based on virtual hardware licenses stored on the license management system. Further, the hardware resource local systems (112, 114) may store hardware resource use entries (discussed in FIG. 2B) that specify which application instances are allowed to access the hardware resources.

In one or more embodiments of the invention, each hardware resources local system (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the hardware resources local system (110) described throughout this application and/or all, or portion, of the method illustrated in FIGS. 2B and 2D.

A hardware resources local system (112, 114) may be implemented as a logical device without departing from the invention. The logical device utilizes computing resources of any number of physical computing devices (e.g., as a converged infrastructure, as a hyper-converged infrastructure, etc.) to provide the functionality of the hardware resources local system (112, 114) described throughout this application and/or all, or portion, of the method illustrated in FIGS. 2B and 2D. For additional details regarding a hardware resources local system (112, 114), see, e.g., FIG. 1B.

In one or more embodiments of the invention, the clients (120) may utilize computing resources (e.g., hardware resources) and/or access data of the hardware resources local systems (110). The clients (120) may further communicate with the license management system (100) to select configuration options for configuring computing devices of the hardware resources local systems (110) and provide the options to the license management system (100).

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, the nodes (130) host application instances (further discussed below). The nodes, acting on behalf of the clients (122, 124), access the hardware resource local systems to perform services for the clients (122, 124) via the application instances.

In one or more embodiments of the invention, each node (132, 134) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A node (132, 134) may be implemented as a logical device without departing from the invention. The logical device utilizes computing resources of any number of physical computing devices to provide the functionality of the client (122, 124) described throughout this application. For additional details regarding a node (132, 134), see, e.g., FIG. 1C.

FIG. 1B shows a diagram of a hardware resource local system in accordance with one or more embodiments of the invention. The hardware resource local system (140) may be an embodiment of hardware resource local system (112, 114, FIG. 1A) discussed above. As discussed above, the hardware resource local system (140) verifies requests by application instances to access and/or otherwise utilize the hardware resources (146A, 146N). To perform the aforementioned functionality, the hardware resource local system (140) may include a hardware resource manager (142), a hardware resource license repository (144), and one or more hardware resources (146A, 146N). The hardware resource local system (140) may include additional, fewer, and/or different components without departing from the invention. Each of the aforementioned components of the hardware resource local system (140) illustrated in FIG. 1B is discussed below.

In one or more embodiments of the invention, the hardware resource manager (142) obtains signed hardware resource documents that specify which application instances are eligible for access to the hardware resources (146A, 146N). The signed hardware resource documents may be verified using public keys obtained from, e.g., the license management system, to confirm the signature of the signed document. Further, the hardware resource manager (142) may update a hardware resource license repository (144) to specify which application instances are exercising the right to access the hardware resources (146A, 146N). The hardware resource manager (142) may perform the methods of FIGS. 2B and 2D to perform the aforementioned functionalities.

In one or more embodiments of the invention, the hardware resource license repository (144) includes hardware resource use entries. Each hardware resource use entry may specify which application instances have been granted access to the hardware resources (146A, 146N) in the hardware resource local system (140) and which application instances are exercising such right to access the hardware resources (146A, 146N). In this manner, the hardware resource local system (140) is equipped to prevent double use of the hardware resources by two distinct application instances operated by the same or different users.

Figure 1C:
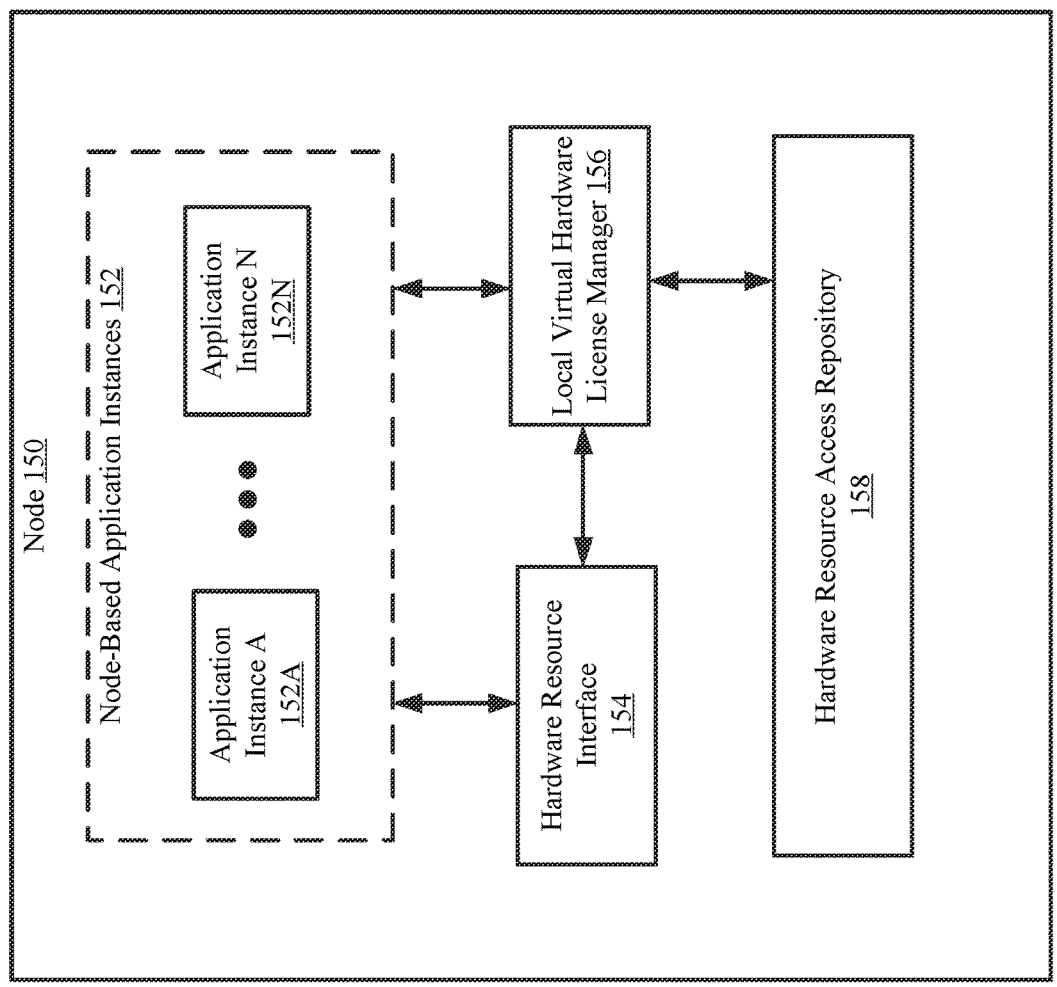
FIG. 1C shows a diagram of a node in accordance with one or more embodiments of the invention.

FIG. 1C shows a diagram of a node (150) in accordance with one or more embodiments of the invention. The node (150) may be an embodiment of a node (132, 134, FIG. 1A) discussed above. The node (150) may include one or more node-based application instances (152) that provide services to clients (e.g., 120, FIG. 1A), a hardware resource interface (154) that connects the application instances (152) to the hardware resources (e.g., 146A, 146N, FIG. 1B) discussed above, a local virtual hardware license manager (156) that manages obtaining access to the hardware resources by the application instances (152), and a hardware resource access repository (158) that specifies which hardware resources may be provided to each application instance (152A, 152N) based on virtual hardware licenses. The node (150) may include additional, fewer, and/or different components without departing from the invention. Each of the aforementioned components illustrated in FIG. 1C is discussed below.

In one or more embodiments of the invention, the node-based application instances (152) may be instances of one or more applications executing on the node (150). The application instances (152A, 152N) may each utilize hardware resources from local hardware resource systems discussed above to provide services to clients. The application instances may initiate access to the hardware resources using, e.g., license requests discussed in FIGS. 2A and 2C.

In one or more embodiments of the invention, the local virtual hardware license manager (156) manages the virtual hardware licenses of the application instances (152) executing on the node (150). The local virtual hardware license manager (156) may manage such virtual hardware licenses by servicing license requests in accordance with FIG. 2A. Further, the local virtual hardware license manager (156) may aid in the takeover of a virtual hardware license by one of the application instances (152A, 152N) via the method of FIG. 2C.

In one or more embodiments of the invention, the hardware resource interface (154) includes functionality for enabling communication between the application instances (152) and hardware resources of the local hardware resource systems discussed above. The communication may be enabled according to access provided by the hardware resource managers (e.g., 142, FIG. 1B) based on license requests as serviced in FIGS. 2A-2D.

The hardware resources interface (154) may be implemented using any suitable interconnection technology including, for example, system buses such as compute express links or other interconnection protocols. The hardware resources interface (154) may support any input/output (IO) protocol, any memory protocol, any coherence interface, etc. The hardware resources interface (154) may support processor to device connections, processor to memory connections, and/or other types of connections. The hardware resources interface (154) may be implemented using one or more hardware devices including circuitry adapted to provide the functionality of the hardware resources interface (154).

In one or more embodiments of the invention, the hardware resource access repository (158) is a data structure that specifies the hardware resources accessible by the application instances (152). The hardware resource access repository (158) may be used to determine which hardware resources are available for allocation. In one or more embodiments of the invention, the hardware resource access repository (158) is updated as license requests are serviced and hardware resources are allocated to the application instances (152).

FIGS. 2A-2D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2D may be performed in parallel with any other steps shown in FIGS. 2A-2B without departing from the scope of the invention.

Figure 2A:
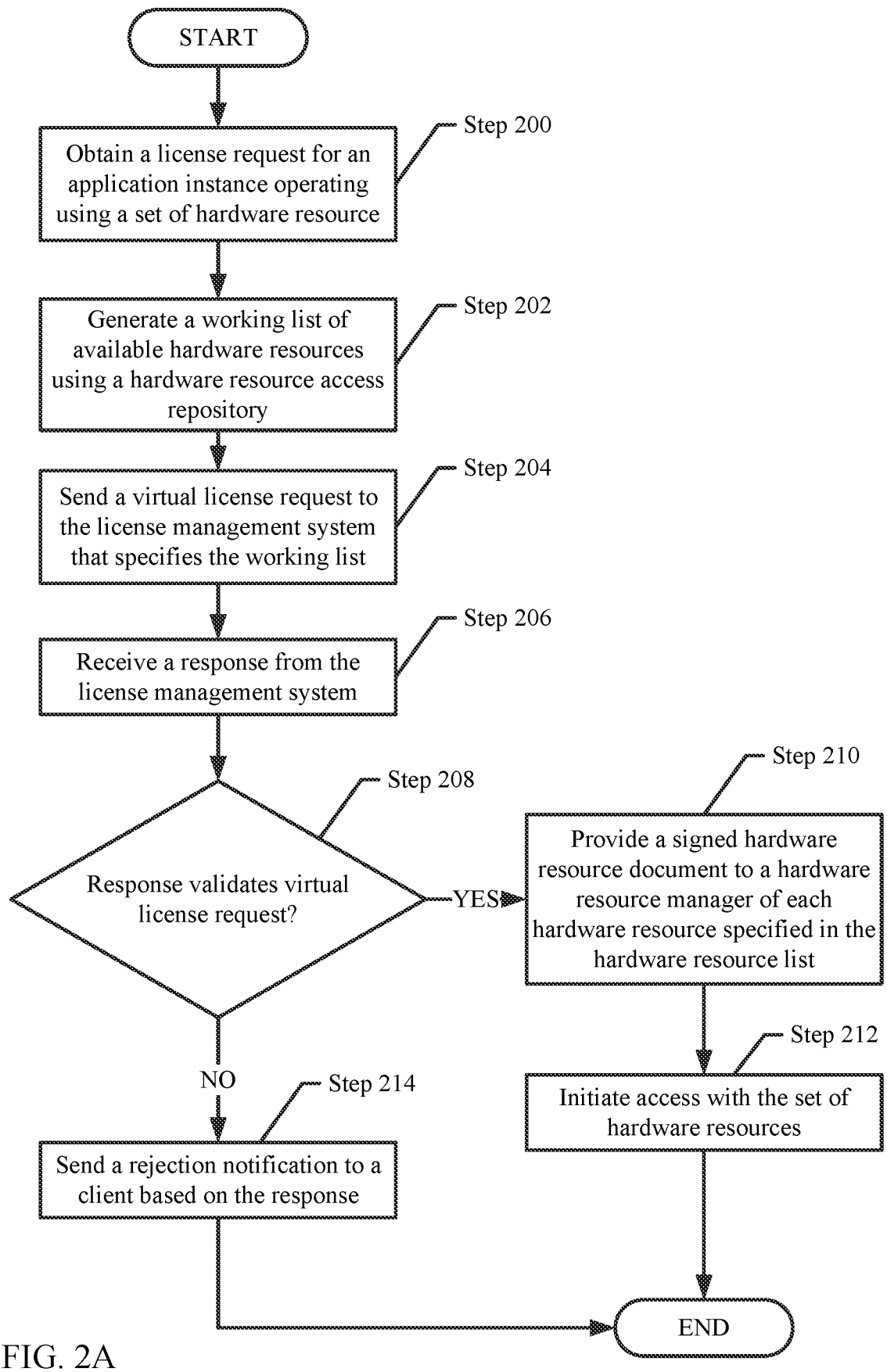
FIG. 2A shows a flowchart for initiating access to a set of hardware resources in accordance with one or more embodiments of the invention.

FIG. 2A shows a flowchart for managing an error message repository in accordance with one or more embodiments of the invention. The method shown in FIG. 2A may be performed by, for example, a local virtual hardware resource manager (156, FIG. 1C). Other components of the system illustrated in FIGS. 1A-1C may perform the method of FIG. 2A without departing from the invention.

Turning to FIG. 2A, in step 200, a license request for an application instance operating using a set of hardware resources is obtained. In one or more embodiments of the invention, the license request specifies accessing a set of one or more hardware resources for a specified period of time.

In step 202, a working list of available hardware resources is generated using a hardware resource access repository. In one or more embodiments of the invention, the working list is a data structure that specifies the available hardware resources that may be allocated to the application instance. The working list may be generated by analyzing the hardware resource access repository and determining which hardware resources have been allocated to an application instance executing on the node, and populating the working list with hardware resources in the system (e.g., in the local hardware resource systems) that are not specified to be allocated.

In step 204, a virtual hardware license request is sent to the license management system that specifies the working list. In one or more embodiments of the invention, the virtual hardware license request further specifies the number of hardware resources requested by the application instance.

In one or more embodiments of the invention, the virtual hardware license request further specifies a selected hardware resource to be provided to the application instance. For example, the local virtual hardware resource manager may generate a verifiable hash value of any combination of: (i) an identifier of the selected hardware resource, (ii) an identifier of the application instance, (iii) an identifier of a user (e.g., a username), or (iv) an identifier of the local virtual hardware resource. The hash value may be performed using an algorithm previously established between the license management system and each of the local virtual hardware resource managers. The hash may be included in the virtual hardware license request.

In step 206, a response from the license management system is received. In one or more embodiments of the invention, the response is a result of a hardware resource analysis performed by the license management system that verifies the validity of the virtual hardware license request.

The validity may be verified by, e.g., recreating the hash value using the previously-established algorithm and determining whether the hash value has been obtained before. For example, the license management system may store a repository of previously-obtained hash values to ensure that the request is not duplicated for multiple application instances of the same user. In this manner, the application executing via multiple application instances does not receive granted access for multiple hardware resources from one license request. In other words, each license request is intended to be serviced on an application-instance level rather than at a user-level.

The response generated by the license management system specifies whether the virtual hardware license request is valid (e.g., whether the hash value is not already in the repository), or whether the virtual hardware license request is rejected (e.g., because the hash value already exists in the repository). Further, if the virtual hardware license request is valid, the response may include a signed hardware resource document, generated using a private key of the license management system. The signed hardware resource document may be used by a hardware resource manager of the requested to verify access of the selected hardware resource by the application instance. For example, the signed hardware resource document may include a signature generated by performing a hash function on the virtual hardware license request (or any portion thereof) using the private key. The hash function may be undone using a public key provided to the local hardware resource manager(s) managing the requested hardware resource(s).

In step 208, a determination is made about whether the response validates a virtual hardware license request. If the response does not validate the virtual hardware license request, the method proceeds to step 214; otherwise, the method proceeds to step 210.

In step 210, a signed hardware resource document is provided to a hardware resource manager of each hardware resource specified in the hardware resource list. The signed hardware resource document may be analyzed in accordance with FIG. 2B.

In step 212, access with the set of hardware resources is initiated. In one or more embodiments of the invention, the access is initiated by preparing a hardware resource interface to enable access with the local hardware resource system by the application instance. The hardware resource interface may be prepared by implementing the required protocols to send and/or obtain data from the specified hardware resource in the local hardware resource system. In this manner, the application instance may utilize the hardware resource to provide the requested service of the user.

In step 214, following the determination that the response does not validate the virtual hardware license request, a rejection notification is sent to a client based on the response.

Figure 2B:
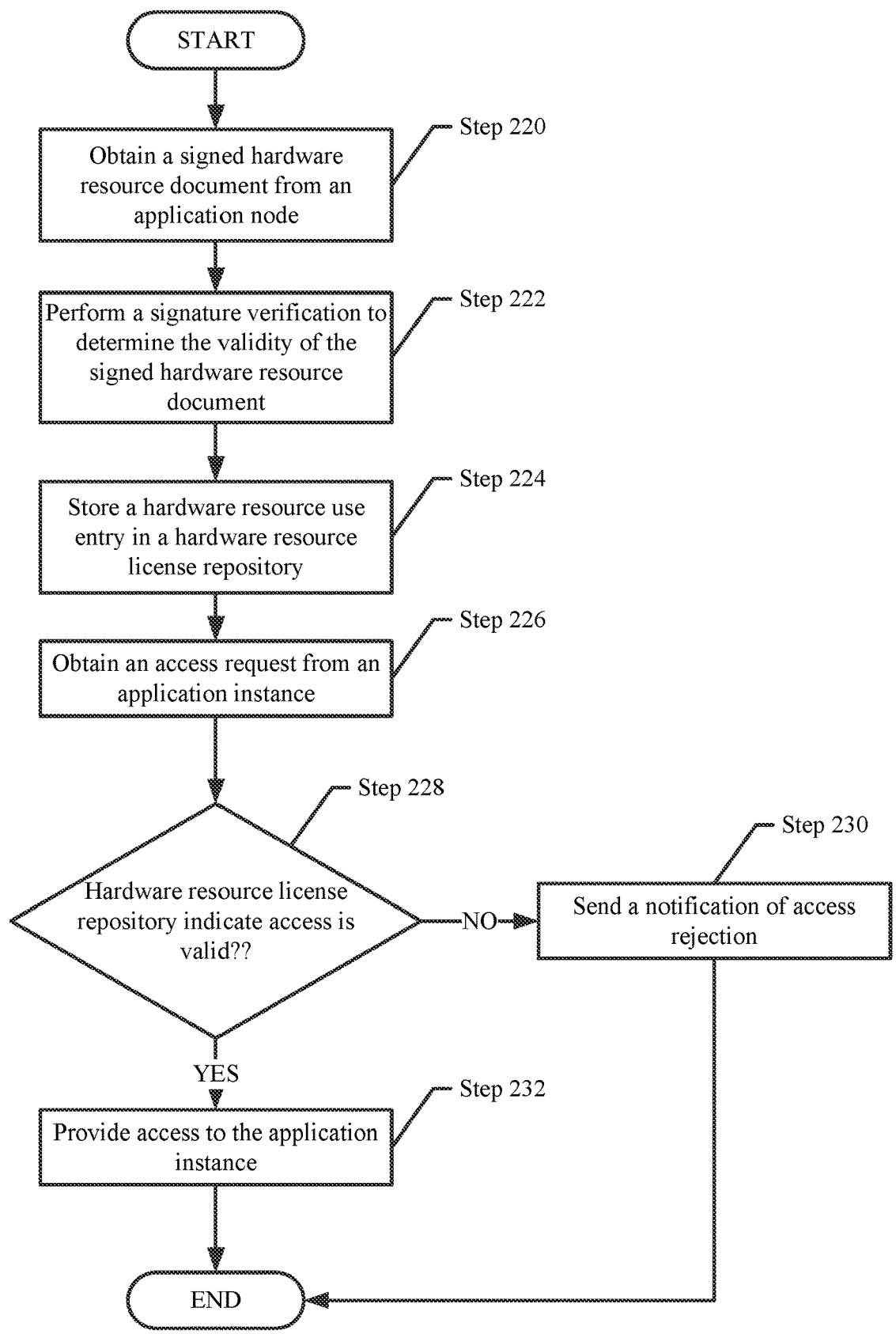
FIG. 2B shows a flowchart for verifying a signed hardware resource document in accordance with one or more embodiments of the invention.

FIG. 2B shows a flowchart for verifying a signed hardware resource document in accordance with one or more embodiments of the invention. The method shown in FIG. 2B may be performed by, for example, a hardware resource local system (112, 114, FIG. 1A). Other components of the system illustrated in FIG. 1A may perform the method of FIG. 2B without departing from the invention.

In step 220, a signed hardware resource document is obtained from an application node. In one or more embodiments of the invention, the signed hardware resource document is the signed hardware resource document discussed in FIG. 2A.

In step 222, a signature verification is performed to determine the validity of the signed hardware resource document. In one or more embodiments of the invention, the signature verification includes performing a hash function on the signature using a previously-obtained public key associated with the signed hardware resource document.

In step 224, a hardware resource use entry is stored in a hardware resource license repository. In one or more embodiments of the invention, the hardware resource use entry specifies a mapping of the application instance specified in the signed hardware resource document with the hardware resource.

In step 226, an access request is obtained from an application instance. The access request may specify accessing the hardware resource specified in the hardware resource use entry. Alternatively, the access request may specify a different hardware resource in the local hardware resource entry.

In one or more embodiments of the invention, the application instance is the application instance specified in FIG. 2A and specified in the hardware resource use entry. Alternatively, the application instance is a different application instance attempting to access the hardware resource.

In step 228, a determination is made about whether the hardware resource license repository indicates access to the hardware resources is valid. In one or more embodiments of the invention, the determination is made using the hardware resource use entry stored in step 224. The hardware resource manager may compare the application instance associated with the access request with an application instance specified in the hardware resource use entry and determine whether there is a match. If the specified application instances match, the determination may be based on whether the hardware resource specified in the access request matches the hardware resource specified in the hardware resource use entry. The access may be valid if both sets of the application instances and the hardware resources match. If the hardware resource license repository indicates access is valid, the method proceeds to step 232; otherwise, the method proceeds to step 230.

In step 230, following the determination that the access is not valid, a notification of access rejection is sent. The notification of access rejection may specify a reason for not allowing the access. The reason may be the incorrect application instance is attempting to access the hardware resource. Alternatively, the reason may be that the application instance is attempting to access the incorrect hardware resource.

In step 232, access to the hardware resources is provided to the application instance. In one or more embodiments of the invention, the access includes initiating communication between the hardware resource and the application instance via a hardware resource interface.

Figure 2C:
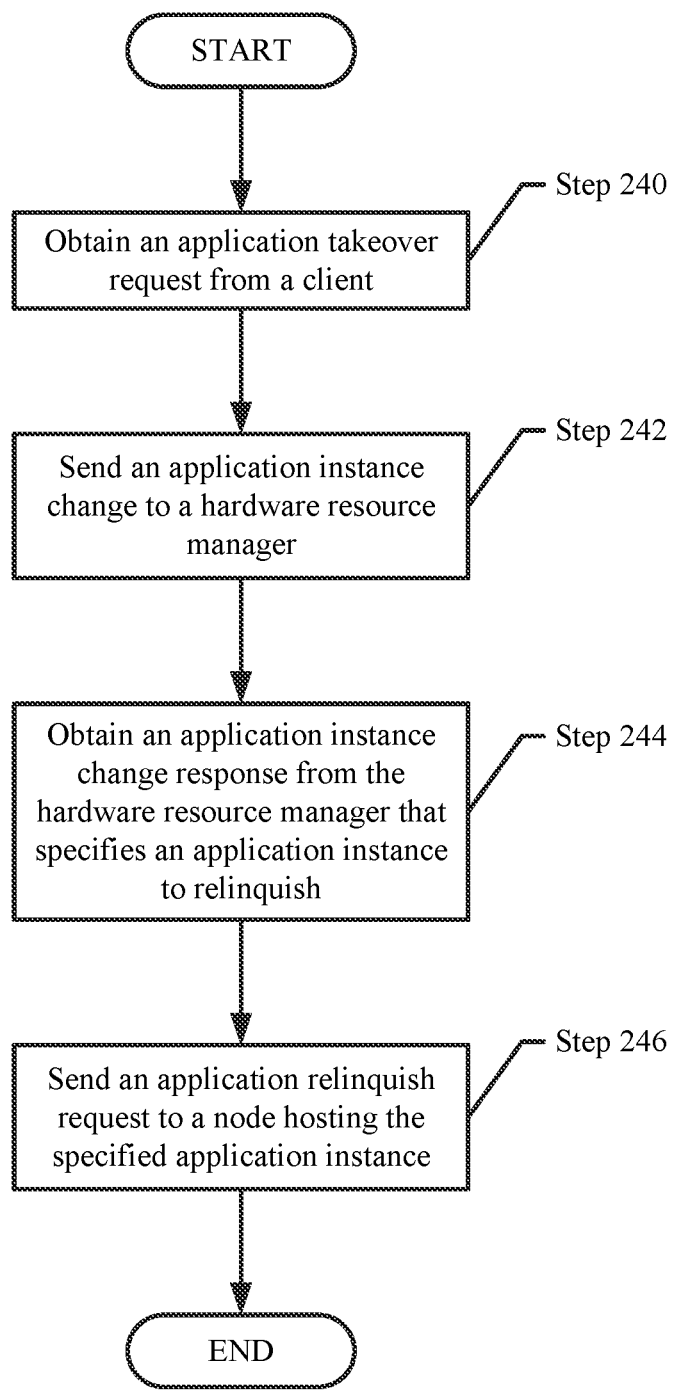
FIG. 2C shows a flowchart for initiating an application instance relinquishing in accordance with one or more embodiments of the invention.

FIG. 2C shows a flowchart for initiating an application instance relinquishing in accordance with one or more embodiments of the invention. The method shown in FIG. 2C may be performed by, for example, a local virtual hardware license manager (156, FIG. 1C). Other components of the system illustrated in FIGS. 1A-1C may perform the method of FIG. 2C without departing from the invention.

In step 240, an application takeover request is obtained from a client. In one or more embodiments of the invention, the application takeover request specifies a first application instance taking over operation of a hardware resource from a second application instance. In one more embodiments of the invention, both application instances are associated with the client.

In step 242, an application instance change request is sent to a hardware resource manager. In one or more embodiments of the invention, the application instance change request specifies transferring the access to the hardware resource from the second application instance to the first application instance. The application instance change request is serviced in accordance with FIG. 2D.

In step 244, an application instance change response is obtained from the hardware resource manager that specifies an application instance to be relinquished. In one or more embodiments of the invention, the application instance response specifies the second application instance that is to relinquish the access to the hardware resource based on the method performed in FIG. 2D.

In step 246, an application relinquish request is sent to a second node hosting the specified application instance. In one or more embodiments of the invention, the application relinquish request specifies relinquishing access to the hardware resource by the specified application instance.

Figure 2D:
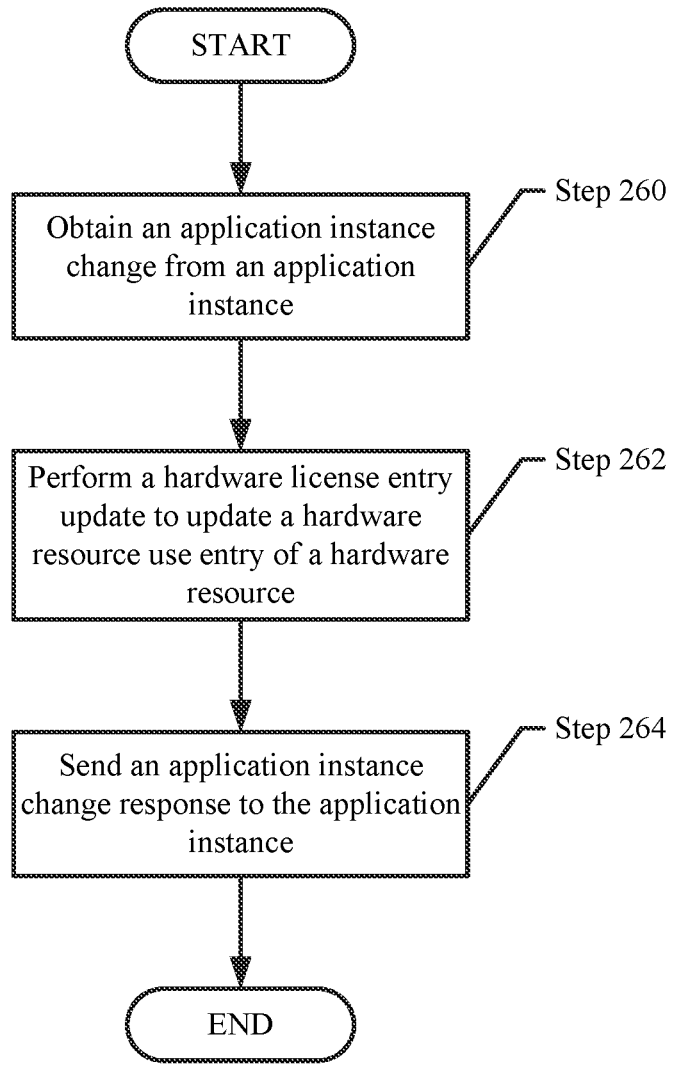
FIG. 2D shows a flowchart for updating a hardware resource license repository in accordance with one or more embodiments of the invention.

FIG. 2D shows a flowchart for updating a hardware resource license repository in accordance with one or more embodiments of the invention. The method shown in FIG. 2D may be performed by, for example, a hardware resource local system (112, 114, FIG. 1A). Other components of the system illustrated in FIG. 1A may perform the method of FIG. 2D without departing from the invention.

In step 260, an application instance change is obtained from an application instance. In one or more embodiments of the invention, the application instance change request specifies changing the application instance accessing the hardware resource from a first application instance to the second application instance.

In step 262, a hardware license entry update is performed to update a hardware resource use entry of a hardware resource. In one or more embodiments of the invention, the hardware resource use entry is updated by replacing the first application instance to the second application specified in the hardware resource use entry. In this manner, if the first application instance attempts to access the hardware resource at a later time, the access would be denied as the hardware resource use entry used to determine the access would no longer specify the first application instance.

In step 264, an application instance change response is sent to the application instance. The application instance change response may specify confirmation of the updated access to the second application instance.

EXAMPLE

Figure 3A:
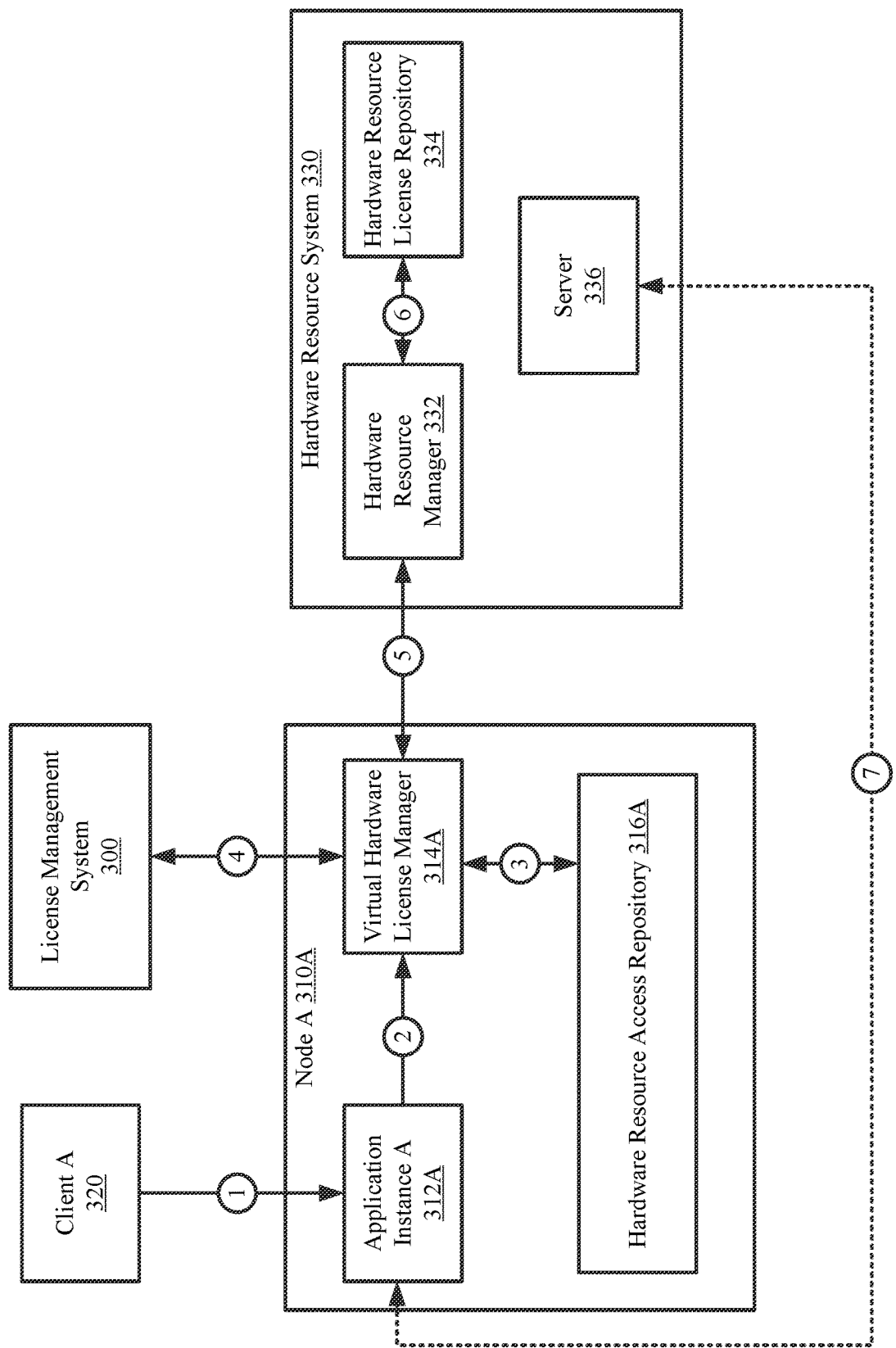
FIGS. 3A-3B show an example in accordance with one or more embodiments of the invention.
Figure 3B:
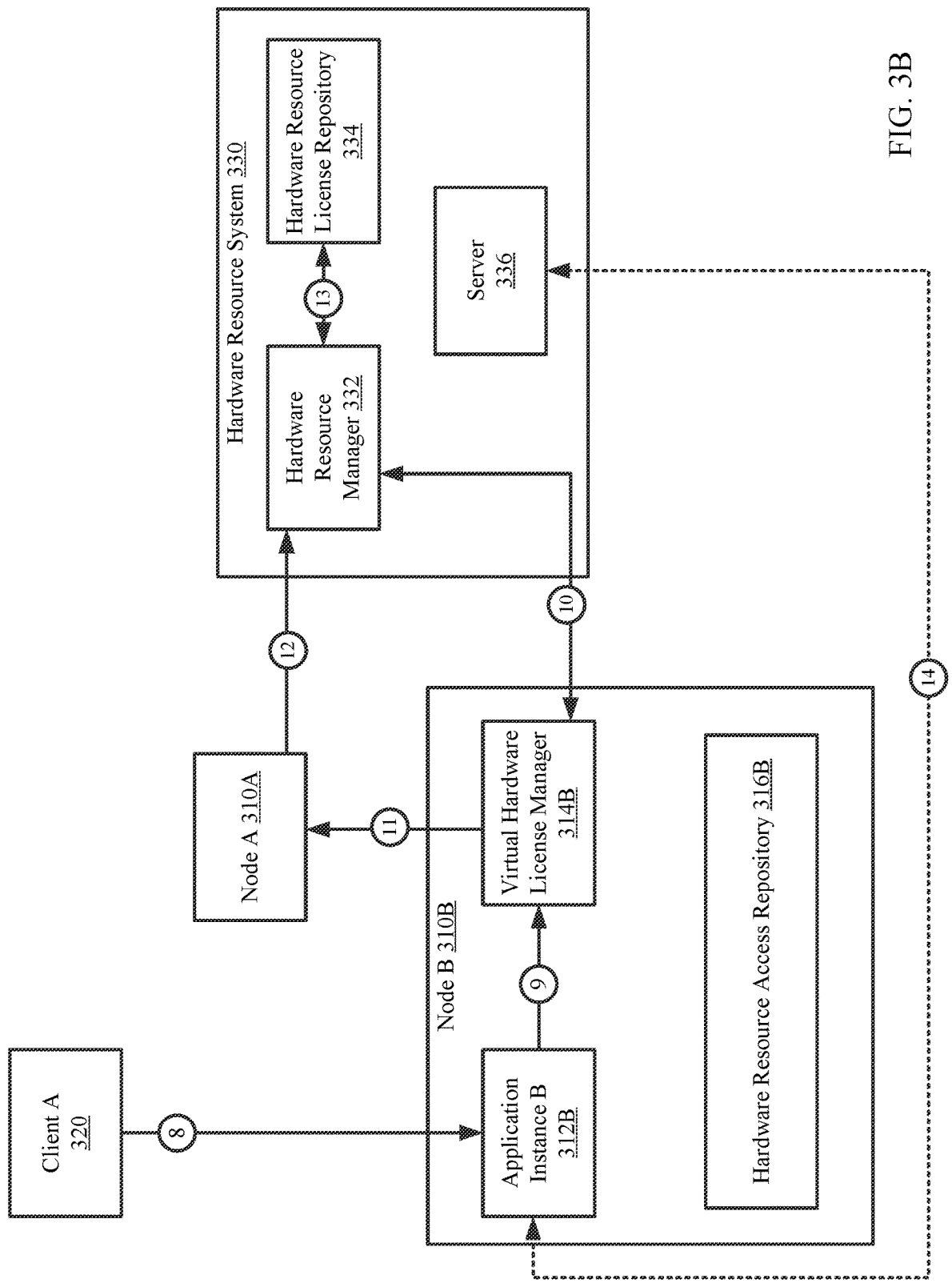

The following section describes an example. The example, illustrated in FIGS. 3A-3B, is not intended to limit the invention. Turning to the example, consider a scenario in which a client (320) using an application instance (312A) on a first node A (310A) desires to utilize a first server. FIG. 3A shows a first diagram of an example system. The example system includes the client (320), node A (310A), a license management system (300), and a hardware resource system (330). For the sake of brevity, not all of the components of the example system are illustrated in FIG. 3A.

The client (320) instantiates a first application instance (312A) [1]. Application instance A (312A) requires the use of an additional server to operate. Application instance A (312A) sends a license request to a virtual hardware license manager (314A) that specifies obtaining access to a server to execute the services of application instance A (312A) [2]. The virtual hardware license manager (314A), in response to the license request, generates a working list of available hardware resources using a hardware resource access repository (316A) [3]. From the working list, a server is selected to be allocated to application instance A (312A). The virtual hardware license manager (314A) sends a virtual hardware license request to the license management system (300) that specifies the selected server on the hardware resource system (330) to be used by application instance A (312A) [4].

The license management system (300), in response to the selected server for application instance A (312A), verifies that the hardware resource has not been previously requested by application instance A (312A) and confirms the validity of the virtual hardware license request. Further, the license management system (300) provides the virtual hardware license manager (314A) with a signed hardware resource document that specifies the server (336).

After obtaining the response, the local virtual hardware license manager (314A) sends the signed hardware resource document to the hardware resource manager (332) [5]. The hardware resource manager (332) verifies the signature of the signed hardware resource document to confirm the validity of the signed hardware resource document. Based on the validity, the hardware resource manager (332) stores a hardware resource use entry in the hardware resource license repository (334) that specifies the server (336) being allocated to application instance A (312A) [6]. Specifically, the hardware resource use entry includes an identifier of the server (336) and an identifier of the application instance (312A).

As a result of the updated hardware resource license repository (334), application instance A (312A) now has access to the server (336) via the hardware resource manager (332) that consults the hardware resource license repository (334) every time the access is initiated [7]. The server (336) provides the services to enable operation of application instance A (312A).

FIG. 3B shows a second diagram of the example system. The example system further includes a second node (i.e, node B (310B)). For the sake of brevity, not all of the components of the example system are illustrated in FIG. 3B. At a later point in time, the client (320) desires to operate using a second application instance (312B) operating in the node B (310B) and to relinquish operation of application instance A (312A). The client (320) may instantiate the application instance (312B) [8]. The application instance (312B) sends an application takeover request to a second virtual hardware license manager (314B) executing on node B (310B) [9]. The second virtual hardware license manager (314B), in response to the application takeover request, communicates with the hardware resource manager (332) to determine which application instance currently has access to the server (336) [10]. The hardware resource manager (332) responds with a message specifying that the server (336) is allocated to application instance A (312A) executing on node A (310A). In response to the message, the second virtual hardware license manager (314B) sends an application relinquish request to the virtual hardware license manager (not shown in FIG. 3A) that specifies relinquishing the access to the server (336) [11].

The second virtual hardware license manager, in response to the application relinquish request, notifies the hardware resource manager of the application relinquish request [12]. The notification prompts the hardware resource manager (332) to update the hardware resource license repository (334) to specify the access be provided to application instance B (312B) instead of application instance A [13]. In this manner, application instance B (312B) now has access to the server (336) via the hardware resource manager (332) that consults the hardware resource license repository (334) every time the access is initiated [14]. The server (336) provides the services to enable operation of application instance B (312B).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the efficiency of managing use of hardware resources by generating hardware license use entries for each pairing of an application instance to a set of hardware resources. As an application instance managed by the same user no longer desires to access the set of hardware resources, embodiments of the invention require the generation of additional virtual hardware licenses, thus reducing revenue loss of the owners and/or managers of the hardware resources caused by attempts of multiple application instances accessing the same set of hardware resources, and increasing the manageability of the use of the hardware resources by hardware resource local systems while maintaining an ease of relinquishing access to the hardware resources by the application instances. Further, embodiments of the invention may replace use of software licenses by implementing the use of virtual hardware licenses that allow the use of node-based applications while associating the application instances to a set of hardware resources. In this manner, as application instances are replaced, new software licenses do not need to be reissued if the same hardware resource(s) are being used.

Thus, embodiments of the invention may address the problem of inefficient use of computing resources. This problem arises due to the technological nature of the environment in which production host environments are executing.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing hardware resources, the method comprising:
   obtaining, by a local virtual hardware license manager, a license request from an application instance;
   in response to the license request:
      sending a virtual hardware license request to a license management system, wherein the virtual hardware license request comprises a hardware resource list;
      making a first determination that a response to the virtual hardware license request validates the virtual hardware license request;
      in response to the first determination:
         providing, based on the hardware resource list, a signed hardware resource document to a hardware resource manager managing a hardware resource, wherein the hardware resource list specifies the hardware resource;
         updating a hardware resource access repository to specify enabled access of the hardware resource by the application instance;
         initiating access to the hardware resource by the application instance;
      after the initiating:
         obtaining an application relinquish request from a second local virtual hardware license manager, wherein the application relinquish request specifies relinquishing access of the hardware resource to a second application instance;
         in response to the application relinquish request, updating the hardware resource access repository to specify that the application instance no longer has access to the hardware resource; and
         sending a confirmation of the relinquishing to the second local virtual hardware license manager.

2. The method of claim 1, further comprising:
   obtaining, by the local virtual hardware license manager, a second license request from the second application instance;
   in response to the second license request:
      sending a second virtual hardware license request to the license management system, wherein the second virtual hardware license request comprises a second hardware resource list;
      receiving a second response from the license management system, wherein the second response comprises the second hardware resource list;
      making a second determination that the response does not validate the second virtual hardware license request; and
      in response to the second determination, sending a rejection notification to the application instance.

3. The method of claim 1, further comprising:
   in response to the first determination:
      providing, based on the hardware resource list, a second signed hardware resource document to a second hardware resource manager managing a second hardware resource, wherein the hardware resource list further specifies the second hardware resource; and
      initiating second access to the second hardware resource by the application instance.

4. The method of claim 1,
   wherein the response comprises a public key, and
   wherein the signed hardware resource document is generated using the public key.

5. The method of claim 1, wherein the hardware resource list specifies a portion of the available hardware resources.

6. The method of claim 1, further comprising:
   obtaining an application takeover request from a client for a second hardware resource;
   in response to the application takeover request:
      sending an application instance change request to a second hardware resource manager, wherein the second hardware resource manager manages the second hardware resource;
      obtaining an application instance change response, wherein the application instance change response specifies the second application instance, wherein the second application instance currently has access to the second hardware resource; and
      sending a second application relinquish request to the second local virtual hardware license manager, wherein the second application relinquish request specifies relinquishing access of the second hardware resource by the second application instance.

7. A non-transitory computer readable medium comprising computer readable program code, which when executed by a computer processor enables the computer processor to perform a method for performing a backup operation, the method comprising:
   obtaining, by a local virtual hardware license manager, a license request from an application instance;
   in response to the license request:
      sending a virtual hardware license request to a license management system, wherein the virtual hardware license request comprises a hardware resource list;

making a first determination that a response to the virtual hardware license request validates the virtual hardware license request;
in response to the first determination:
providing, based on the hardware resource list, a signed hardware resource document to a hardware resource manager managing a hardware resource, wherein the hardware resource list specifies the hardware resource;
updating a hardware resource access repository to specify enabled access of the hardware resource by the application instance;
initiating access to the hardware resource by the application instance;
after the initiating:
obtaining an application takeover request from a client for a second hardware resource;
in response to the application takeover request:
sending an application instance change request to a second hardware resource manager, wherein the second hardware resource manager manages the second hardware resource;
obtaining an application instance change response, wherein the application instance change response specifies a second application instance, wherein the second application instance currently has access to the second hardware resource; and
sending an application relinquish request to a second local virtual hardware license manager, wherein the application relinquish request specifies relinquishing access of the second hardware resource by the second application instance.

8. The non-transitory computer readable medium of claim 7, the method further comprising:
obtaining, by the local virtual hardware license manager, a second license request from the second application instance;
in response to the second license request:
sending a second virtual hardware license request to the license management system, wherein the second virtual hardware license request comprises a second hardware resource list;
receiving a second response from the license management system, wherein the second response comprises the second hardware resource list;
making a second determination that the response does not validate the second virtual hardware license request; and
in response to the second determination, sending a rejection notification to the application instance.

9. The non-transitory computer readable medium of claim 7, the method further comprising:
in response to the first determination:
providing, based on the hardware resource list, a second signed hardware resource document to the second hardware resource manager managing the second hardware resource, wherein the hardware resource list further specifies the second hardware resource; and
initiating second access to the second hardware resource by the application instance.

10. The non-transitory computer readable medium of claim 7,
wherein the response comprises a public key, and
wherein the signed hardware resource document is generated using the public key.

11. The non-transitory computer readable medium of claim 7, wherein the hardware resource list specifies a portion of the available hardware resources.

12. The non-transitory computer readable medium of claim 7, the method further comprising:
obtaining a second application relinquish request from the second local virtual hardware license manager, wherein the second application relinquish request specifies relinquishing access of the hardware resource to the second application instance;
in response to the second application relinquish request, updating the hardware resource access repository to specify that the application instance no longer has access to the hardware resource; and
sending a confirmation of the relinquishing to the second local virtual hardware license manager.

13. A system, comprising:
a processor; and
memory comprising instructions which, when executed by the processor, perform a method, the method comprising:
obtaining, by a local virtual hardware license manager, a license request from an application instance;
in response to the license request:
sending a virtual hardware license request to a license management system, wherein the virtual hardware license request comprises a hardware resource list;
making a first determination that a response to the virtual hardware license request validates the virtual hardware license request;
in response to the first determination:
providing, based on the hardware resource list, a signed hardware resource document to a hardware resource manager managing a hardware resource, wherein the hardware resource list specifies the hardware resource;
updating a hardware resource access repository to specify enabled access of the hardware resource by the application instance;
initiating access to the hardware resource by the application instance;
after the initiating:
obtaining an application relinquish request from a second local virtual hardware license manager, wherein the application relinquish request specifies relinquishing access of the hardware resource to a second application instance;
in response to the application relinquish request, updating the hardware resource access repository to specify that the application instance no longer has access to the hardware resource; and
sending a confirmation of the relinquishing to the second local virtual hardware license manager.

14. The system of claim 13, the method further comprising:
obtaining, by the local virtual hardware license manager, a second license request from the second application instance; and
in response to the second license request:
sending a second virtual hardware license request to the license management system, wherein the second virtual hardware license request comprises a second hardware resource list;
receiving a second response from the license management system, wherein the second response comprises the second hardware resource list;

making a second determination that the response does not validate the second virtual hardware license request; and in response to the second determination, sending a rejection notification to the application instance.

15. The system of claim 13, the method further comprising:

in response to the first determination:

providing, based on the hardware resource list, a second signed hardware resource document to a second hardware resource manager managing a second hardware resource, wherein the hardware resource list further specifies the second hardware resource; and initiating second access to the second hardware resource by the application instance.

16. The system of claim 13, wherein the response comprises a public key, and wherein the signed hardware resource document is generated using the public key.

17. The system of claim 13, the method further comprising:

obtaining an application takeover request from a client for a second hardware resource;

in response to the application takeover request:

sending an application instance change request to a second hardware resource manager, wherein the second hardware resource manager manages the second hardware resource;

obtaining an application instance change response, wherein the application instance change response specifies the second application instance, wherein the second application instance currently has access to the second hardware resource; and sending a second application relinquish request to the second local virtual hardware license manager, wherein the second application relinquish request specifies relinquishing access of the second hardware resource by the second application instance.

\* \* \* \* \*